United States Patent
Hamann et al.

(10) Patent No.: US 6,294,070 B1
(45) Date of Patent: Sep. 25, 2001

(54) PROCESS FOR ELECTROLYTICALLY PRODUCING METAL-AMALGAM

(75) Inventors: Carl Heinz Hamann, Ovelgoenne; Peter Schmittinger, Unterhaching; Joerg Helling, Oldenburg, all of (DE)

(73) Assignee: Degussa-Huels Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/272,779

(22) Filed: Mar. 19, 1999

(30) Foreign Application Priority Data

Mar. 19, 1998 (DE) ............................................... 198 12 105

(51) Int. Cl.[7] ............................... C25C 1/24; C25C 1/16; C25B 9/00
(52) U.S. Cl. .......................... 205/558; 205/262; 204/251; 204/296
(58) Field of Search .................................... 205/558, 562; 204/251, 290, 296

(56) References Cited

U.S. PATENT DOCUMENTS

| 4,004,987 | | 1/1977 | Chang . | |
| 4,917,781 | * | 4/1990 | Sharivian et al. | 204/251 X |
| 4,938,854 | * | 7/1990 | Sharifian et al. | 20/251 X |

FOREIGN PATENT DOCUMENTS 2 016 207  10/1971 (DE) .

OTHER PUBLICATIONS

Database WPI, Derwent Publications, AN 73–15191U, SU 346365 *No date available.

* cited by examiner

Primary Examiner—Donald R. Valentine
(74) Attorney, Agent, or Firm—Oblon, Spivak, McClelland, Maier & Neustadt, P.C.

(57) ABSTRACT

A process for electrolytically producing an amalgam from metal salt, using an anion exchanger membrane. The chlorine-free process provides amalgam produced from metal salt and having a high degree of purity, and ensures advantageous parameters, such as a low cell voltage and high current efficiencies.

20 Claims, No Drawings

PROCESS FOR ELECTROLYTICALLY PRODUCING METAL-AMALGAM

BACKGROUND OF THE INVENTION

1. Field of the Invention

The present invention relates to a process for electrolytically producing amalgam from metal salt.

2. Background of the Invention

Amalgams are alloys of mercury with alkali metals, alkaline-earth metals or transition metals. They are widely used in industry. In dental technology, tin/copper/noble-metal amalgams are used as tooth fillings. Gold amalgam and silver amalgam can be used to purify mercury-containing gases and liquids. The use of alkali-metal amalgams as reducing agents in the chemical industry, for example for producing alkali-metal alcoholates, is well-known. Sodium amalgam is an important intermediate in chlor-alkali electrolysis. The amounts of amalgam used on a large industrial scale for reactions are normally obtained by this process. The desired amalgam is obtainable at a mercury cathode by electrolysis. Alkali-metal amalgams are usually produced as intermediates in the amalgam process of chlor-alkali electrolysis. In this process, aqueous sodium chloride solution is decomposed by electrical energy to form sodium hydroxide solution, chlorine and hydrogen:

$$2NaCl + 2H_2O \rightarrow 2NaOH + H_2 + Cl_2$$

The anode product chlorine is separated from the cathode product amalgam. The amalgam flows in the recirculating system via a so-called decomposer connected downstream and is electrolytically further decomposed in aqueous solution in the latter to form sodium hydroxide solution with simultaneous evolution of hydrogen. Mercury is used as cathode and a graphite anode or an activated titanium anode is usually used as anode.

The use of chlorine in industry is restricted because of a potential safety and health risk of chlorine gas and of chlorinated reaction products, such as, for example, CFCs, vinyl chloride and tetrachloromethane. It is therefore not always economically expedient to produce large amounts of chlorine as a byproduct of the electrolysis Already known from the 1940's is a process in which alkali-metal sulfate is subjected to electrolysis in order to produce alkali-metal amalgam without the formation of chlorine. The alkali-metal sulfate is electrolyzed between mercury and lead with silver added in an electrolysis cell which is divided by a porous rubber membrane. The amalgam is produced at the cathode and oxygen and sulfuric acid at the anode. The sulfate solution is fed into the cathode space and forced through the diaphragm. The current efficiency in this process is, however, very low and, in addition, the sulfuric acid produced on the anode side is contaminated with sodium sulfate.

To summarize, it can be stated that, in the production process of amalgam using the conventional chlor-alkali electrolysis,. chlorine is produced as a troublesome by-product and this process is furthermore restricted to alkali chlorides as starting material. The chlorine-free process results only in low current efficiencies and a contamination of the reaction products.

SUMMARY OF THE INVENTION

Proceeding from the above mentioned disadvantages of the respective processes, it is an object of the present invention to provide a process for the chlorine-free electrolytic production of amalgam from metal salt. The process should at the same time ensure a high degree of purity of the final products and advantageous parameters, such as a low cell voltage and high current efficiencies.

This object is achieved with a process in which an anion exchanger membrane is used in the electrolytic production of the amalgam. Accordingly, the present invention provides a process for producing a metal-mercury amalgam, by applying an electric current to an electrolysis cell containing:
- a cathode comprising mercury metal,
- an aqueous solution of a metal salt in contact with the cathode,
- an anode, and
- an anion exchanger membrane between the cathode and the anode.

The present invention also provides an electrolytic cell for conducting the inventive process that includes the anode, the cathode, and the anion exchanger membrane between the cathode and the anode.

Surprisingly it was found that the process according to the invention has the properties required above and is consequently an improvement on the existing production processes.

DETAILED DESCRIPTION OF THE INVENTION

The electrode reaction is similar to the abovementioned process. If, for example, sodium sulfate is used as the metal salt, the electrolysis can be described by the following equation:

$$2Na_2SO_4 + 2H_2O \xrightarrow{Hg} 4Na/Hg + 2H_2SO_4 + O_2$$

Consequently, the amalgam is produced at the cathode and sulfuric acid and oxygen at the anode.

Generally, the electrolysis is carried out as follows:

The anion exchanger membrane divides the electrolysis cells into a cathode space and an anode space. Initially, the anode space contains a dilute acid solution in a concentration of 0.01 M–0.20 M, which contains the acid-radical ion of the metal salt. The aqueous metal-salt solution, which is in a concentration of 5.0–0.5 M, preferably 2.0–0.5 M, is pumped into the cathode space. When current passes through this electrolyte solution, decomposition of the metal salt occurs. In this process, the metal ions migrate towards the cathode and the electrode reaction results in the formation of the desired amalgam. The anions pass through the anion exchanger membrane and thus enter the anode space. They are present in aqueous solution as anions of the corresponding acid and form the anolyte. At the anode, decomposition of the water also occurs and, consequently, protonization of the acid anions occurs with simultaneous evolution of oxygen. The metal salt in aqueous solution, also referred to as catholyte, and the anolyte are circulated and fed back again to the electrolysis cell.

Amalgams can be produced with alkali metals, alkaline-earth metals and noble metals, zinc, cadmium, tin, lead and copper. Preferably, alkali metals are used for the purpose of amalgamation in the process according to the invention. Particularly preferably, sodium or potassium is used as alkali metal for the purpose of amalgam production. All the usual anions can be used as anionic constituent (acid-radical ions). Preferably, nitrate, sulfate, phosphate, phosphite and carbonate ions are used. Sulfates are particularly preferred as the anions.

Initially pure mercury may serve as the cathode in the present process. Activated titanium which contains a noble-metal or noble-metal oxide coating is preferably used as anode. Platinum is preferably used as noble metal. The anode obtained in this way is remarkable for a low overvoltage for the oxygen evolution. The purpose of the noble metal coating is to catalyze the passage of electrons for the oxygen evolution. The use of titanium has proved advantageous as an anode material because of its good chemical stability. However, the anode material is not limited to this embodiment and other materials having adequate chemical stability may be used if an equally high or higher exchange current density exists for the oxygen evolution.

To perform the process according to the invention, all the obtainable anion exchanger membranes can be used. The anion exchanger membrane used for the process according to the invention contains a polymer which preferably has amino groups. The amino groups contained in the polymer are preferably terminal, positively charged ammonium groups. The freely mobile counterions contained in the polymer can be exchanged for other anions and are consequently responsible for the selective charge transfer. Anion exchanger membranes of the Neosepta® type are preferably used as membrane. These are commercially obtainable. Particularly preferably, membranes of the Neosepta® types AMX, AMA-2 and ACLE-5 P are used.

The anion exchanger membrane is preferably a thin film approximately 0.1 to 0.6 mm thick with adequate strength and chemical stability. It is permeable only to anions under the influence of a potential difference. The anion exchanger membrane used for the process according to the invention is remarkable for being very stable with time, with a constant exchange capacity and chemical stability.

The process according to the invention for electrolytically producing amalgam with the aid of an anion exchanger membrane is generally carried out as follows:

The current density at the cathode is adjusted to 1.5 to 3.5 kA m$^{-2}$. A current density of 2.0 to 3.0 kA m$^2$ is preferred. The temperature is 30 to 90° C. during the electrolysis. A temperature of 50 to 70° C. is preferred. Depending on the system, a run of 5 to 8 hours leads to a current efficiency of over 95% and up to 99%. The process may proceed continuously or discontinuously.

Having generally described this invention, a further understanding can be obtained by reference to certain specific examples which are provided herein for purposes of illustration only and are not intended to be limiting unless otherwise specified.

EXAMPLES

Example 1

An electrolysis of sodium sulfate is carried out at 60° C. in an electrolysis cell divided by an anion exchanger membrane (Neosepta® ACLE 5 P). Initially pure mercury serves as cathode. The current density at the cathode is adjusted to 2.6 kA m$^{-2}$. Catholyte (1.3 M Na$_2$SO$_4$) and anolyte (0.12 M H$_2$SO$_4$) are circulated. After 5.5 hours, sodium amalgam has been produced at the cathode with a current efficiency of 98%. Corresponding amounts of sulfuric acid and oxygen are produced at the anode.

Obviously, numerous modifications and variations of the present invention are possible in light of the above teachings. It is therefore to be understood that within the scope of the appended claims, the invention may be practiced otherwise than as specifically described herein.

This application is based on German Patent Application No. 198 121 05.9, filed on Mar. 19, 1998, and incorporated herein by reference in its entirety.

What is claimed is:

1. A process for producing a metal-mercury amalgam, comprising:
    applying an electric current to an electrolysis cell comprising:
    a cathode comprising mercury metal,
    an anode, and
    an anionic exchange membrane between the cathode and the anode, thereby producing a metal-amalgam at the cathode.

2. The process of claim 1, wherein the metal salt is a metal nitrate, a metal sulfate, a metal phosphate, a metal phosphite or a metal carbonate.

3. The process of claim 1, wherein the metal salt is sodium sulfate or potassium sulfate.

4. The process of claim 1, wherein the metal salt is sodium sulfate.

5. The process of claim 1, wherein the metal salt is potassium sulfate.

6. The process of claim 1, wherein the anode comprises platinum-coated titanium.

7. The process of claim 1, wherein the anion exchanger membrane contains a polymer, wherein the polymer contains amino groups.

8. The process of claim 1, wherein the anion exchanger membrane contains a polymer, wherein the polymer contains ammonium groups.

9. The process of claim 1, wherein the anion exchanger membrane has a thickness of 0.1 to 0.6 mm.

10. The process of claim 1, wherein the concentration of the metal salt in the aqueous solution is 0.5 to 5.0 M.

11. The process of claim 1, wherein the cathode, at the start of the process, consists essentially of pure mercury.

12. The process of claim 1, wherein the metal salt is a salt of an alkali metal, an alkaline earth metal or a noble metal.

13. The process of claim 1, wherein the metal salt is a salt of zinc, cadmium, tin, lead or copper.

14. An electrolysis cell for producing mercury amalgams, comprising:
    a cathode comprising mercury metal,
    an anode, and
    an anionic exchange membrane between the cathode and the anode dividing the cell into cathode and anode compartments which are adapted to be filled with a metal salt solution, wherein the metal of the salt upon reduction, at the cathode, amalgamates with said metal.

15. The electrolysis cell of claim 14, wherein the anion exchanger membrane contains a polymer, wherein the polymer contains amino groups.

16. The electrolysis cell of claim 14, wherein the anion exchanger membrane contains a polymer, wherein the polymer contains ammonium groups.

17. The electrolysis cell of claim 14, wherein the anion exchanger membrane has a thickness of 0.1 to 0.6 mm.

18. The electrolysis cell of claim 14, wherein the anode comprises platinum-coated titanium.

19. The electrolysis cell of claim 14, wherein the cathode consists essentially of pure mercury.

20. The electrolysis cell of claim 14, wherein the cathode compartment is adapted to contain an aqueous solution of a metal salt which contacts the cathode.

* * * * *